United States Patent [19]

Goldberger

[11] Patent Number: 5,294,382
[45] Date of Patent: Mar. 15, 1994

[54] METHOD FOR CONTROL OF RESISTIVITY IN ELECTROCONSOLIDATION OF A PREFORMED PARTICULATE WORKPIECE

[75] Inventor: William M. Goldberger, Columbus, Ohio

[73] Assignee: Superior Graphite Co., Chicago, Ill.

[21] Appl. No.: 544,046

[22] Filed: Dec. 14, 1990

Related U.S. Application Data

[63] Continuation-in-part of Ser. No. 286,980, Dec. 20, 1988, abandoned.

[51] Int. Cl.$^5$ .............................................. B29C 43/02
[52] U.S. Cl. ................................... 264/27; 264/56; 264/120; 264/320; 264/321; 419/49
[58] Field of Search ............... 264/27, 56, 65, 120, 264/320, 321, 45.3; 419/38, 48, 49, 69

[56] References Cited

U.S. PATENT DOCUMENTS

| | | |
|---|---|---|
| 1,223,322 | 4/1917 | Gebauer . |
| 1,346,192 | 7/1920 | Gebauer . |
| 2,021,576 | 11/1935 | McKenna . |
| 3,356,496 | 12/1967 | Hailey ............................ 75/226 |
| 3,556,780 | 1/1971 | Holtz . |
| 3,689,259 | 9/1972 | Hailey . |
| 3,746,518 | 7/1973 | Holtz . |
| 4,041,123 | 8/1977 | Lange et al. ................. 264/332 |
| 4,142,888 | 3/1979 | Rozmus . |
| 4,227,927 | 10/1980 | Black et al. .................... 75/225 |
| 4,389,362 | 6/1983 | Larsson . |
| 4,406,762 | 9/1983 | Ray et al. . |
| 4,414,028 | 11/1983 | Inoue ............................ 419/31 |
| 4,431,605 | 2/1984 | Leuth ............................ 419/26 |
| 4,446,100 | 5/1984 | Adlerborn ..................... 419/48 |
| 4,499,048 | 2/1985 | Hanejko ......................... 419/49 |
| 4,499,049 | 2/1985 | Hanejko ......................... 419/6 |
| 4,501,718 | 2/1985 | Bradt ............................. 419/49 |
| 4,518,441 | 5/1985 | Hailey . |
| 4,533,004 | 8/1985 | Ecer . |
| 4,539,175 | 9/1985 | Lichti et al. ................... 419/49 |
| 4,547,337 | 10/1985 | Rozmus ......................... 419/49 |
| 4,554,130 | 11/1985 | Ecer ............................... 419/8 |
| 4,560,409 | 12/1985 | Goldberger et al. . |
| 4,562,892 | 1/1986 | Ecer . |
| 4,592,252 | 6/1986 | Ecer . |
| 4,594,219 | 6/1986 | Hostatter et al. ............. 419/8 |
| 4,597,456 | 7/1986 | Ecer . |
| 4,601,887 | 7/1986 | Dorn et al. .................... 422/150 |
| 4,603,062 | 7/1986 | Ecer ............................... 427/181 |
| 4,630,692 | 12/1986 | Ecer . |
| 4,634,572 | 1/1987 | Lichti ............................ 419/44 |
| 4,640,711 | 2/1987 | Lichti ............................ 75/248 |
| 4,667,497 | 5/1987 | Oslin et al. ................... 72/62 |
| 4,673,549 | 6/1987 | Ecer ............................... 419/10 |
| 4,687,400 | 8/1987 | Lichti ............................ 414/4 |
| 4,704,252 | 11/1987 | Pfaffmann ..................... 419/49 |
| 4,715,313 | 12/1987 | Ecer ............................... 118/105 |
| 4,724,123 | 2/1988 | Rozmus, Jr. .................. 419/68 |
| 4,755,343 | 7/1988 | Kromrey ....................... 264/102 |
| 4,847,021 | 7/1989 | Montgomery . |
| 4,853,178 | 8/1989 | Oslin ............................. 419/23 |

OTHER PUBLICATIONS

Sheppard, "Predicting HIP's Future" Advanced Materials & Processes, pp. 24–30, Mar. (1986).
Owen et al "Development and Evaluation of High Temperature/Low Friction Copper-Graphite Composites" Paper presented at TMS-AIME Meeting, Mar. 2–6, 1986, New Orleans, La.

(List continued on next page.)

Primary Examiner—Mary Lynn Theisen
Attorney, Agent, or Firm—Allegretti & Witcoff, Ltd.

[57] ABSTRACT

The present invention comprises an improved method of controlling resistivity in a process for consolidating particular materials or combinations of such materials into shaped products of very low porosity. High compaction pressures are applied at temperatures in the range of sintering temperature of the materials being consolidated to achieve essentially complete densification at extremely rapid processing rates. Electrothermal heating of a medium having controlled resistivity is utilized to accomplish these results. Various difficult materials, such as silicon carbide, boron carbide and other very high melting point materials, may be densified by these techniques.

20 Claims, 4 Drawing Sheets

OTHER PUBLICATIONS

Ferguson et al "Hot Consolidation of Porous Preforms Using 'Soft' Tooling" International J. of Powder Metallurgy & Powder Tech. 20, 2,131, 1984.

James "Overview of High Density P/M Processes" International J. of Powder Metallurgy & Powder Technology 21 3 163 (1985).

Marcus et al "High Energy, High Rate Materials Processing" Journal of Metals, pp. 6–10 Dec. 1987.

Widmer "The Role of Hot Isostatic Pressing-Now and In the Future" American Society For Metals pp. 105–116 Jun. 1985.

Lee et al "Rapid Rate Sintering of $Al_2O_3$–TiC Composites for Cutting Tool Applications" Advanced Ceramic Materials 3 1988.

Borom et al "Effect of Heating Rate on Densification of Alumina–Titanium Carbide Composites" Advanced Ceramic Materials 1 4 335 1986.

THE VARIATION OF THE ELECTRICAL RESISTIVITY OF GRAPHITE CARBON WITH SILICON CARBIDE CONTENT

FIG. 4

METHOD FOR CONTROL OF RESISTIVITY IN ELECTROCONSOLIDATION OF A PREFORMED PARTICULATE WORKPIECE

This application is a continuation-in-part application of Ser. No. 286,980 filed on Dec. 20, 1988, now abandoned.

BACKGROUND OF THE INVENTION

The present invention is directed to a method of controlling resistivity in associated methods of consolidating particulate metals, ceramic materials, or combinations of such materials into shaped products of very low porosity. More specifically, this invention provides controlled resistivity in connection with a means to apply high compaction pressures at temperatures in the range of sintering temperature of the materials being consolidated to achieve essentially complete densification at extremely rapid processing rates as compared with prior art technologies. Moreover, because this invention employs a method of electrothermal heating generally referred to as "charge-resistor" heating, the temperatures that can be obtained by the process of this invention are well above the requirements for even the most refractory and heretofore difficult materials to densify a wide variety of metallic and ceramic materials, such as silicon carbide, boron carbide and other very high melting point materials.

Processes for making dense metallic and/or ceramic articles from their powders are well established in industrial practice of the prior art. It is possible, for example, by the method known as "hot pressing," to place the powder between two cylindrical pistons contained within a cylindrical chamber having only a slightly greater diameter than the pistons, and by application of heat and pressure directly to the powder, the powder can be formed into a highly dense cylindrical billet. Because the method applies an external pressure directly to the material at or near its sintering temperature, hot pressing will yield consolidated product of higher density than if the powder material is densified by pressureless sintering. Hot pressing is a relatively simple prior art method to achieve essentially complete densification and is widely used to make many articles in present commercial use. However, because high temperatures are needed to consolidate high melting point metal alloy powders and the recently developed high performance ceramic materials, the dies and plungers used for hot pressing must be made of a material capable of withstanding the required temperature. Graphite is the most practical material and is commonly used in commercial hot pressing of ceramics. To avoid oxidation of graphite tooling, the hot processing apparatus must be enclosed within a controlled atmosphere chamber, and shielded therein by inert gases. Often, a vacuum is also pulled on the chamber containing the hot pressing apparatus to allow for the removal of reactive gases that may evolve during heating of the material.

A major disadvantage of this method of consolidation is that the cycle time for hot pressing increases with temperature, making the process slow at very high temperature. It is a further disadvantage that in order to utilize effectively the space available in a hot pressing furnace, it is necessary to assemble a series of parts into a "stack". This procedure can be intricate and not readily adapted to automated production.

Even more disadvantageous from the standpoint of commercial production of high performance structural ceramics is that it is impossible to use simple uniaxial hot pressing to make parts of complex shape. For example, turbine rotors that have intricate curved shapes and substantial variation in the thickness cannot be hot pressed.

To make an article of complex shape, the processing that is generally used has involved "performing" the powder into a partially densified article having the desired shape of the finished part, then further consolidating the pre-form in a second step. Methods commonly used to make the pre-form include die pressing, slip casting, injection molding and extrusion. Pre-forms can then be further consolidated by one or a combination of operations that include cold isostatic pressing, hot pressing, hot isostatic pressing (HIPing), cold and hot forging, hot extrusion and pressureless sintering.

Hot isostatic pressing or HIPing involves sealing a pre-form in an evacuated flexible container and inserting the cladded part into a heating chamber and heating to the sintering temperature. The container can be a thin metal sheath that can be welded, evacuated and sealed. If the metal cladding material is properly selected, it will deform to the shape of the preform and transmit pressure uniformly and isostatically to the part being consolidated. Pressure is applied by compression of the gas in the surrounding chamber. For ceramic components that require very high temperatures to achieve consolidation, for example silicon carbide parts, a metal sheath may be impractical and means to encapsulate the part in a glass composition have been developed.

Hot isostatic pressing does provide a means to consolidate metal and ceramic preforms into dense articles of complex shape, and there is a growing use of HIPing in commercial production of powdered metal parts and ceramic components. However, the major use of HIP has been to densify cast metals and to consolidate powder metal parts. HIP technology can be applied to ceramic materials including the high temperature non-oxide ceramics, such as silicon carbide; but the costs are very high. Temperatures in excess of 2000° C. are needed at pressures of 30,000 psi or higher. As in hot pressing, HIPing entails long cycle times. Because the cost of high pressure equipment and systems are higher than for hot pressing, HIPing is more expensive. There has therefore been increasing interest in other methods that would allow production of ceramic components of complex shape at lower cost.

Yet further, one method receiving extensive study by ceramicists is pressureless sintering. Pressureless sintering involves making preforms of the part from ultra-fine, sinter-active ceramic powder, for example by injection molding or cold isostatic pressing, then heating the pre-form to a temperature approaching the melting point of the material(s) to be sintered, causing a shrinkage and consolidation to the desired final size and shape. Pressureless sintering not only can consolidate complex and intricately shaped parts, but it offers the obvious advantage of adaptation to continuous and easily automated production with inherently lower cost of mass production.

Despite already noted advantages of the pressureless sintering method, technical factors may limit the ability to utilize this process to make certain high performance structural ceramic components from certain powdered ceramic materials. This is particularly true in the case of the high melting temperature non-oxide ceramic materials such as the nitrides, carbides, and borides. For example, to achieve a near theoretical density part by pressureless sintering of silicon carbide powders, it is mandatory to use a silicon carbide powder that is all substantially below 1-2 micron particle size, and meeting close chemical specifications with regard to contained oxygen, carbon and trace elements.

Deviation from these specifications will lead to failure to obtain an essentially pore-free and homogeneous flaw-free structure absolutely necessary to obtain the high strength characteristics required in aircraft or automotive engine turbine rotors. Thus, the prosecution of suitably qualified powders meeting the rigorous demands for pressureless sintering involves intricate and careful control that results in relatively high cost starting raw material powders. Furthermore, even with the most careful control during production of powders, pressureless sintering at high temperature requires a finite time during which the preformed powder compact must remain at the sintering temperature to allow for full shrinkage and densification. Inherent with the sintering process is the tendency for growth of the grains causing departure from the idealized ultra-fine, equi-axed microstructure that offers the highest material strength. Powders that undergo crystal phase transformation at or near the sintering temperature are particularly susceptible to grain growth and a resulting decrease in strength properties. This effect is made more pronounced with increased residence time at the sintering temperature.

It can be noted that very high temperatures are needed to sinter materials that are candidates for high performance engine components. As stated, silicon carbide requires temperatures above 2000° C. to achieve a high degree of densification by pressureless sintering. Although it would be highly desirable from the standpoint of minimizing grain growth to rapidly heat a preform to the sintering temperature and limit the time at temperature to no longer than several minutes, and, possibly to residence times of no more than several seconds, there are a number of practical limitations to doing this by a pressureless sintering process. First, sintering furnaces of conventional design are simply not suited to a quick entry or withdrawal of the material being sintered. More important, however, is the fact that gases are likely to evolve from the preform during heat-up due to a combination of desorption, decomposition and chemical reaction. Too rapid a heat-up rate and associated gas evacuation rate can cause mechanical stresses that would fracture the part. And thirdly, too rapid a heating and/or cooling could also cause fracture due to differential expansion or contraction, referred to as "thermal shock". The limits of temperature raise rate and cooling rate during pressureless sintering are different for different materials and are dictated by the specific material being processed and the size and shape of the part.

However, it should be noted in regard to the limits of temperature rise rate and the speed of the sintering cycle that substantially higher cycle rates are possible when the material is being subjected to pressure, for example as in hot pressing. Pressure minimizes cracking due to gas evolution and, if maintained during the densification cycle, it allows a substantially closer approach to achieving theoretical density than by pressureless sintering.

Thus, the present state of the art can be summarized, as follows: the pressureless sintering method for the manufacture of advanced materials by consolidation from powders, and particularly for making high performance ceramics, represents the most attractive method from the standpoint of high volume-low cost production. However, the mechanical properties obtained in pressureless sintered materials are generally not as good as in materials made by application of pressure during sintering, as is the case for hot pressed and/or HIPed products. But these latter methods are either unsuited for making parts of complex shape, and/or are very slow, and/or are unable to be easily or fully automated; thus, they are very expensive.

It is therefore one material object of the present invention to overcome many of the difficulties of the prior art methods, and more particularly to provide a controlled and controllable means for extremely rapid sintering under pressure to achieve consolidated parts of low porosity and having a flaw-free and ultra-fine grain structure.

It is a further object of the present invention to be able to accomplish these basic objectives even with materials that require temperatures well above 2100° C.

It is still further the purpose of the present invention to accomplish the above objectives within seconds using temperature rise rates in excess of 50° C./sec.

Moreover, it is the purpose of this invention to consolidate preformed materials of complex shape under compaction pressures approaching isostatic compaction conditions. It is still further the purpose of this invention to accomplish these objectives using relatively inexpensive apparatus that is simple in construction and operation and that can be readily adapted to automated, controlled, and continuous high volume production.

It is recognized that some of the above objectives of the present invention have been addressed, in certain asects by previous workers. In that regard, descriptions of processes intended as improvements in manufacture of parts by consolidation of powders have been described in the technical literature and in previously issued patents. Examples are the patents issued to Lichti and Hofstatter (U.S. Pat. Nos. 4,539,175 and 4,640,711). These workers have demonstrated that simple tooling similar to that used in hot pressing can in fact be used to consolidate articles of complex shape by first surrounding the article by a spherically shaped particulate medium which has sufficient resiliency to be deformed under high compaction pressures without excessive breakage and thereby transmit the compaction pressure in a nearly isostatic manner to the part being consolidated. The Lichti-Hofstatter patents (U.S. Pat. Nos. 4,539,175 and 4,640,711) note the advantages provided by using Superior Graphite Co. spherical graphitic carbon product (9400 Series) as the preferred pressure transmitting particulate medium.

Although the consolidation methods of Lichti and Hofstatter theoretically may offer significant advantages in consolidation of pre-formed articles, it has in actual practice been found quite difficult to apply and to control the described procedure for materials requiring very high temperatures for consolidation—for example, for materials that must be heated to above 1500° C. (2732° F.) to achieve densification. U.S. Pat. No. 4,539,175 to Lichti et. al. notes that the consolidation process takes place after the heated preform is placed in a bed of previously heated carbonaceous particles (Col. 4, lines 35 et seq.). It is further stated that although the graphite particles can be heated inductively to 4000° F. (2204° C.), oxidation is significant above 800° F. Hence, it follows that the operation step at temperatures approaching 4000° F. (2204° C.) would become extremely difficult. U.S. Pat. No. 4,539,175 specifically notes that heating to the necessary temperature is done before compaction.

U.S. Pat. No. 4,640,711 describes again the consolidation process thereof and notes the use of a non-graphitic spherical carbon and mixtures of graphite and non-graphitic spherical carbon and mixtures of sperical carbon and/or spherical graphitic carbon and ceramic particles as the pressure transmitting medium. U.S. Pat. No. 4,640,711 is again specific in noting that the preform and the bed of particles are to be at elevated temperature before pressurization. Thus, the patented processes of the Lichti and Hofstatter patents require that both the particulate medium and the pre-form be preheated independently and then individually transported to the compaction apparatus in sequence to allow the pre-form to be immersed within the medium prior to compaction. Such transfer of materials after heating becomes extremely difficult at temperatures needed to consolidate non-oxide ceramics, such as silicon carbide (1990°–2150° C.), and apparatus to accomplish the transfer is complex, expensive and wasteful of energy.

It is further recognized that a process has been reported by Eliezer and co-workers at the University of Texas referred to as High-Energy, High-Rate Consolidation, which utilizes a very high energy electrical discharge, not through a bed, but rather directly to the pre-form while applying compaction pressure to the preform. In this process, electrical energy is transmitted directly through the material being consolidated, and thus can be used only to consolidate those materials having sufficient electrical conductivity. By using a suitably electrically conductive particulate medium, the present invention is not so restricted, and material with no electrical conductivity can be consolidated by the process hereof. Yet further, since the process described by Eliezer et al. is conducted in a manner similar to hot pressing, it is no more suited than hot pressing for making components of complex shape.

In view of the Lichti-Hofstatter and Eliezer et al. processes, it is still another objective of the present invention to utilize the principle of consolidation by compacting a free flowing solid particulate medium as a near isostatic pressure transmitter, but to accomplish heating and compaction essentially simultaneously by a rapid, convenient and energy efficient means. It is a further object of the present invention to include embodiments utilizing a bed material which is not confined to the narrowly specific bed material of the prior art.

It is also an object of the present invention to control the resistivity of the bed material for use in the electroconsolidation process of the present invention according to the following principles.

The important purpose of developing a means to control the specific resistance of the medium relates to optimizing conditions for any particular application hereof. The system hereof in electrical terms in certain embodiments is inherently a relatively low resistance system. That is, for a given power application (i.e., 10 Kw, 100 Kw, etc.) the applied voltage will be low and the current high. The reason for this phenomenon is that it is desired to have the materials of construction, specifically the top and bottom plungers (parts 52 and 16 hereof) which carry the electrical current, made of a very low resistance material (such as, for example, graphite, copper, etc.), to avoid resistive heating of the apparatus and the resulting loss of temperature control and extraneous power losses. Thus, the main electrical resistance of the system will be that of the pressing medium.

One preferred pressing medium is a graphitic carbon, such as Superior Graphite Special Graphitic Carbon 9400 Grade, produced by Superior Graphite Co., Chicago, Ill. This material has the desired excellent flow characteristics and elastic modules (resiliency) and inert character to work as a pseudo-isostatic pressure transmitting medium. However, being a graphitized carbon, its resistivity is relatively low (0.03–0.05 ohm-cm). Low system resistance has the disadvantage of requiring relatively high current to develop the needed electrothermal conversion of electrical energy into heat by means of electrical resistive heating. The apparatus must therefore be designed with the ability to operate with high current flow that requires connecting cables of high current rating, or possibly the use of water cooling. This adds significantly to the cost of the apparatus. It is readily calculated from established electrical system relationships the amount of current that must be passed through the medium to achieve the electrothermal conversion energy release necessary to raise the preform temperature to the sintering temperature within a desired time cycle. For example, to achieve an energy release of 50 Kw with a system offering only $2.0 \times 10^{-3}$ ohms resistance, it will be necessary to pass 5,000 amps through the apparatus. By increasing the system resistance to $8.0 \times 10^{-3}$ ohms, the required current can be reduced to 2,500 amps with a corresponding reduction made in the current rating of the auxiliary process equipment, bus bars and connecting cables. Therefore, in general, it is desired to have a pressing medium having a relatively high specific resistance.

Actually, the resistivity of a packed bed of a particulate material is not directly measurable as in the case of a solid material that can be cut into a specific shape and is at the full or theoretical density of the particular material. Resistivity of a packed bed of particles is strongly dependent on the applied pressure. Thus, the reported resistivity of a particular medium is defined by the method of measurement and more specifically to the applied pressure and to the size distribution of that material as both conditions affect the degree of packing of the material.

Various methods for measuring the electrical resistivity of particulate carbon materials are known in the prior art. It can also be noted in the prior art that the specific resistance of particulate carbons is very dependent on the pressure applied to bed of the carbon. See "Electrical Properties of Carbons—Resistance of Powder Materials, *Carbon*, Vol. 24 pp. 337–41 (1986). Thus, to some degree in the electroconsolidation processes hereof the system resistance may be influenced by the pressure being applied. However, to achieve the highest degree of densification, it may be desireable to apply the highest possible pressure, and therefore the use of pressure as a means to increase the system resistance may not in reality constitute a viable method for that purpose. It is therefore, necessary to increase the specific resistance of the particulate medium material, according to the practices and principles of the present invention.

The specific resistivity of packed materials has been determined to be dependent on the degree of particle-to-particle contact, which determines the actual interparticle area of contact, and thus the resistance of the contact. Thus, the application of pressure on the packed bed serves mainly to increase the area of inter-particle contact by compressing particles against each other. This is especially true of softer more elastic materials such as graphitic carbons.

It is further recognized also that surface hardness is also an important factor in the electrical resistance of particle-to-particle contact in a packed bed of particles, just as it is in the contact resistance between bulk solid materials. For example, the contact resistance between solid graphite and highly conductive solid copper is almost twice as much as between solid graphite and graphite, even though the resistivity of graphite is more than 1,000 times that of copper. This results because graphite is a relatively soft material that is much more readily deformed under pressure, and thus effectuates a more highly effective area of contact. Moreover, the cleanliness of the surface and any film(s) on the surface also may significantly affect contact resistance.

Based upon the forgoing, it is therefore a further aspect of the present invention that the contact resistance, and therefore the resistivity of, a packed bed of graphitic carbon particles can be increased by introducing film-forming materials that tend to coat the surface of the particles. More specifically, as set forth in the present invention, if films can be formed on the surface of the graphitic carbon particles that were harder than graphite, the electrical resistivity of packed beds of this product is thereby rendered substantially greater than that of the initial bed of graphitic carbon particles. Furthermore, materials which react with the graphitic carbon surfaces to form hard compounds stable at high temperature have special advantages for use in the electroconsolidation process of the present invention, particularly for consolidation processes requiring high temperatures. Thus, the class of film forming compounds of the present invention comprises hard, high temperature stable compounds such has carbides, borides, nitrides and related chemical complexes such as carbo-nitrides, etc., the use and composition of which are described in greater detail hereinbelow.

SUMMARY OF THE INVENTION

The present invention comprises an improved method of controlling resistivity in a process for consolidating a wide variety of metallic, ceramic and mixed workpieces, for example, preformed from particulate, powdered, sintered, fibrous, spongy, or other solid containing material capable of consolidation. The steps of such improved process include providing a bed of electrically conductive, flowable particles within a contained zone. Next, the preformed workpiece is positioned in such bed of resistivity controlled, electrically conductive, flowable particles. Next, sufficient compaction of the electrically conductive medium for good electrical conductivity is provided. Thereafter, electrical energy is applied to the electrically conductive, flowable particles within the bed in an amount sufficient to heat the bed to the consolidation temperature for the workpiece. Finally, pressure is applied to the bed of the electrically conductive flowable particles in an amount sufficient to effectuate substantial consolidation of the workpiece.

The resistivity of such electrically conductive, flowable particles is controlled by altering the surface and/or interior porous conductive and/or hardness characteristics thereof, as set forth in more detail, infra. More particularly, such particulate contacting characteristics are altered in preferred embodiments of the present invention by means of coating of various substances onto the surface of or within the pores of the electrically conductive, flowable particles.

Additional details of the improved methods of the invention hereof will be better understood with reference to the following brief description of the drawing, detailed description of preferred embodiments, appended claims and accompanying drawing.

BRIEF DESCRIPTION OF THE DRAWING

The improved methods of the present invention may be better understood with reference to the accompanying drawing, and in which.

DETAILED DESCRIPTION OF PREFERRED EMBODIMENTS

The present invention comprises an improved method of controlling the resistivity of electrically conductive, flowable particles for use in consolidating in general workpieces preformed from particulate, pondered, sintered, fibrous, spongy, or other solid containing material capable of consolidation. The steps of such improved process include providing a bed of electrically conductive, flowable particles with controlled surface characteristics to control the resistivity thereof, and thereafter disposing such particles within a contained zone. Next, the preformed workpiece is positioned in such bed of electrically conductive, flowable particles. A suitable pressurization is provided to the bed material to allow for adequate electrical contact of the bed particles. Thereafter, electrical energy is applied to the electrically conductive, flowable particles within the bed in an amount sufficient to heat the bed to the consolidation temperature for the workpiece. Finally, pressure is applied to the bed of the electrically conductive flowable particles in an amount sufficient to effectuate substantial consolidation of the workpiece. Such pressure may be uniaxially applied in certain preferred embodiments.

Some aspects of the general process for using such electrically conductive, flowable particles having modified surface and/or inter-porous characteristics are initially described. In preferred embodiments of the general method hereof, the electrically conductive flowable particles of the bed may preferably consist primarily of flowable and resiliently compressible carbonaceous particles in the form of beads, which may also have outwardly projecting nodules thereon, and at least some beads may have surface fissures thereunto.

The particular workpiece may comprise silicon carbide, boron carbide, and/or combinations of other carbides, and/or in conjunction with metals, or metals, per se.

The amount of electrical energy applied to the bed of conductive flowable particles would in preferred embodiments be sufficient to raise the temperature of such bed to a temperature in excess of approximately 2200° C., for certain uses, such as ferrous-based materials, although lower temperatures (such as approximately 1000° C.) may be adequate for other material such as oxides, powdered metals, non-ferrous materials, etc. Further, such preferred embodiments provide for such temperature rise in less than approximately 60 seconds.

The electrically conductive bed is substantially electrically isolated from its surroundings in preferred embodiments. Also in such embodiments, a supply of inert gas is inputted and maintained within the bed prior to and during the application of electrical energy to the bed.

Such particles of the bed may also comprise a silicon carbide spherical graphitic carbon. Such silicon carbide spherical graphite carbon may comprise substantially spherical particles having a diameter of approximately 0.1 mm. to 0.8 mm. Such silicon carbide spherical graphite carbon may comprise approximately 50% silicon carbide, with substantially the balance thereof comprising free carbon. However, such silicon carbide spherical graphite carbon may have some tendency to sinter, especially in consolidating silicon carbide workpieces. But, nonetheless, such silicon carbide materials may provide more beneficial properties in certain applications, including more accurate control of resistivity, especially in lower temperature applications.

The electrically conductive flowable particles may in some preferred embodiments have an electrical resistivity of approximately 0.012 ohm-in. for some specific uses. Such particles may likewise have a resiliency of approximately at least 50%.

In addition to other materials, the preformed workpiece may include as a binder a phenolic resin binder in an amount equal to provide approximately 2% free carbon after pyrolysis. A compaction pressure of approximately 1,000 psi may be utilized, but greater pressures (such as 2,000 psi) are also beneficially used in other embodiments.

The inert gas utilized may comprise nitrogen, argon, or the noble gasses.

The electrical energy applied may comprise approximately 15 volts DC at 800 amps for approximately 30 seconds duration, in some systems, depending on the size of the equipment, the workpiece, configuration and material of the workpiece. These parameters and others may be adjusted by one of ordinary skill in the art without undue experimentation.

Such consolidation may in preferred embodiments constitute approximately at least 80% densification. The preformed work piece may preferably comprise 60% densification prior to the application of electrical energy and pressure thereto. The density of such preformed work piece may be increased in preferred embodiments from approximately 2.01 g/cc to approximately 2.80 g/cc.

Boron may be incorporated into the structure of the particles of the electrically conductive flowable bed, and may constitute 1.75% by weight of electrically conductive flowable particles, in preferred embodiments.

The preformed workpiece may be formed by a variety of techniques in preferred embodiments, including cold compaction, and such cold compaction may be uniaxially applied.

Such preformed workpiece may comprise approximately 1% by weight of a 5% solution of phenolic resin as dissolved in a solvent prior to pyrolysis.

At least approximately 20 KW of electrical energy may be preferably applied to the electrically conductive flowable particles during consolidation of such workpiece.

To accomplish the objectives of the present invention, the particulate medium is selected not only to provide the desired compressibility or resiliency characteristics and temperature stability property described in Lichti-Hofstatter, supra, but also to be a suitably electrically conductive material to enable electrical current to be passed through the compaction assembly, and thereby to allow heating by direct electrothermal resistive heating of the medium during the compaction cycle. Such direct electrothermal heating takes place from within the apparatus and more specifically from within the zone between the compaction plungers where the pre-form is contained. Therefore, there is no need to preheat either the pre-form or the particulate medium, or to transfer hot materials from separate auxiliary heaters to the compaction device. It should be evident, therefore, with appropriate design of the compaction chamber and choice of the electrically conductive and resilient particulate medium that extremely high energy release rates are possible. In fact, in the present invention temperatures well in excess of 2200° C. are achieved in less than 60 seconds of current flow in a device of the type described.

EXAMPLE I

Figure 1:
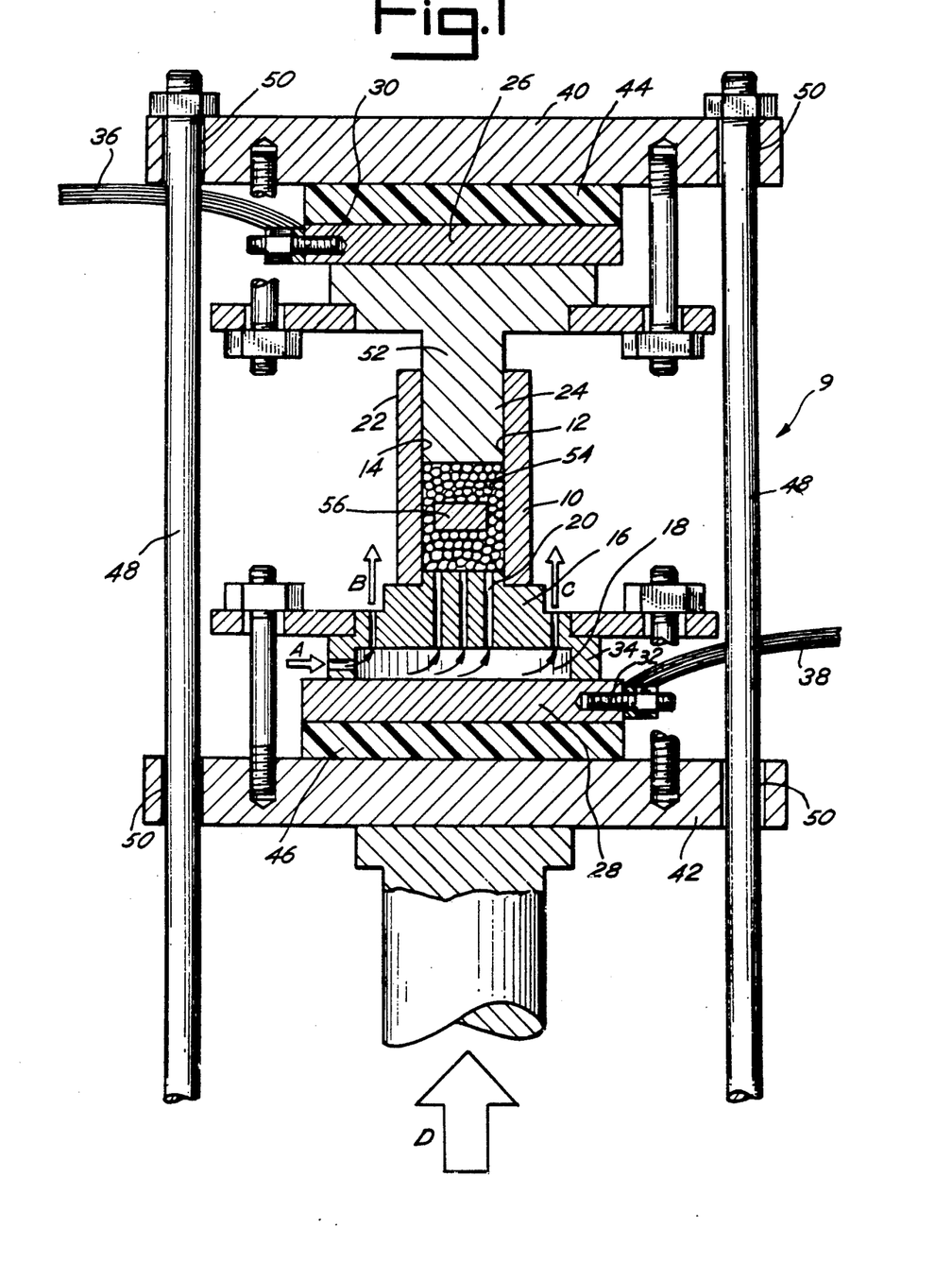
FIG. 1 depicts a partially longitudinal cross-sectional view of an apparatus suitable for carrying out the improved method of the present invention, including a cylindrical vertical sleeve with a ceramic coating on the interior thereof which sleeve is subjected to the compressive force of a graphite piston disposed for longitudinal movement therein for compressing the particulate contents of such sleeve.

As an example of one application of the present invention, an apparatus generally as shown in FIG. 1 was assembled comprising a cylindrical vertical sleeve 10 of 2-inches in height having a 2⅜ inch OD and 1 15/16 inch ID. This sleeve 10 was machined from solid graphite stock. To minimize electrical conduction through the inner surface 12 of sleeve 10, a ceramic coating 14 was applied by painting inner surface 12 with a silicon carbide-containing paint obtained from ZYP Coatings, Inc. Sleeve 10 was placed on a machined graphite support 16 having a plenum chamber 18 into which inert gas (see Arrow A) was admitted through gas inlets 20 comprising an array of small holes drilled vertically from the top which allowed the inert gas to escape plenum 18 and to shield the outside 22 of vertical sleeve 10 from attack by ambient air, as shown at Arrows B, C, D.

A vertical graphite piston 24 of 4-inch height overall was machined from 2¼ inch cylindrical stock to a diameter of 1¾ inch for entry from above into vertical sleeve 10, as shown in FIG. 1.

Upper and lower copper plates 26,28 respectively of ¼ inch thickness containing connected drilled holes to serve as cooling water channels were positioned in direct contact with piston 24 and lower support 34 and served as electrical contactors. In turn, these were connected by electrical cables attached at tap hole connectors 30,32 to a DC power supply of 600 KW capacity, designated respectively 36,38.

The above assembly was held between platens 40,42 of a hydraulic press and electrically insulated by insulating plates 44,46 made of a composition referred to as "glastic". Tie down bolts 48 were used to provide a compressive force to the upper and lower assemblies through apertures 50.

EXAMPLE II

A series of experiments was made to determine the ability to consolidate silicon carbide by the improved method hereof. The experiments were conducted by introducing into the sleeve a 75 g charge of particulate medium 54 comprising a silicon carbide sperical carbon. This product comprises small spheres of 0.1 to 0.8 mm diameter and contains approximately 50 percent SiC, with the balance constituting free carbon. The silicon carbide spherical carbon is available from Superior Graphite Co. of Chicago, Ill., and measured 0.012 ohm-in electrical resistivity and had a resiliency determined to be 52 percent. Resiliency is defined as the percentage increase in volume of a sample upon release of 10,000 psi compaction pressure.

A 1-inch D×$\frac{1}{4}$-in pre-form of silicon carbide in the form of a workpiece 56 was then placed in the bed of particulate such that it was oriented horizontally. The pre-form was made with Superior Graphite Co. silicon carbide (Type HSC 059), contained approximately 2 percent by weight $B_4C$, and had been formed by cold compaction using a phenolic resin binder in an amount equivalent to provide about 2 percent free carbon after pyrolysis.

After insertion of the silicon carbide pellet, the plunger was brought into the sleeve and a compaction pressure of 1000 psi was applied by a hydraulic cylinder (unshown) and which raised the lower platen 42 of the press (see larger Arrow D in FIG. 1).

Nitrogen flow was started (see Arrow A) and power at 15 volts DC and 800 amps was maintained for 30 seconds. Sleeve 10 was noted to begin to glow red, as did the lower section 52 of plunger 24 that extended above cylindrical sleeve 10.

After cooling and removal of the pellet, it was found that the silicon carbide spherical graphitic carbon had partially sintered around the silicon carbide pellet. The pellet was removed, weighed and measured, and was found to have consolidated from a 60 percent dense material to 80 percent.

EXAMPLE III

A further experiment was conducted using a 1-inch diameter silicon carbide pre-form made as set forth in Example II, supra, but preheated to 1500° C. in a laboratory furnace to fully pyrolyze the phenolic resin binder. In this experiment, electrical current was applied and maintained at 12 KW input for 1 minute while maintaining a 1000 psi compaction pressure. The pellet after the experiment was found to increase in density from 2.01 g/cc to 2.80 g/cc corresponding to an increase from 60 percent of the theoretical density of silicon carbide to 87.2 percent of theoretical density of silicon carbide.

Thus, although these initial experiments of Examples II and III did not demonstrate complete consolidation of silicon carbide, they did establish operability of the rapid high energy process hereof for consolidation of high temperature materials.

EXAMPLE IV

The silicon carbides used in some embodiments of the present invention are available from Superior Graphite Co. of Chicago, Ill. under the trademark "HSC". Such HSC silicon carbides have been developed for a wide range of uses including metallurgical additions, refractries, fine abrasive grit, and for high performance ceramics and special heat resistant composite materials.

The HSC 059 grade of silicon carbide is prepared by processing run-of-furnace grade material to remove excess free carbon. This wet milled and chemically purified free flowing powder can be used directly in: metal or ceramic matrix composites, metallurgical and refractory applications, lapping and fine abrasive grit, high purity silicon carbide reaction bonded and pressureless or HIPed sintered ceramics. Table 1 sets forth the specifications of such desired materials.

TABLE 1

TYPICAL PARTICLE SIZE DISTRIBUTION

| (micrometers) | | | Surface area Cut-off | Bulk Density ($m^2$/g:BET) | Particle Density |
|---|---|---|---|---|---|
| $d_{90}$ | $d_{50}$ | $d_{10}$ | Cut-off | ($m^2$/g:BET) | 1.32 + 0.07 gm/cm3 |
| 1.3 | 0.60 | 0.25 | 99% <2 | 15+ | |

TYPICAL CHEMICAL ANALYSIS (Weight Percent)

| Component | Range | Typical |
|---|---|---|
| Silicon Carbide (beta type) | 98.0–99.1 | 98.5 |
| Oxygen | 0.65–0.85 | 0.80 |
| Nitrogen | 0.15–0.25 | 0.21 |
| Silicon (metallic) | 0.1 Maximum | 0.03 |
| Sulfur | 0.5 Maximum | 0.05* |
| Carbon (free) | 0.50–1.00 | 0.85 |

TYPICAL SPECTROGRAPHIC ANALYSIS, PPM**

| Element | Range | Typical | Element | Range | Typical |
|---|---|---|---|---|---|
| Fe | 100–500 | 160 | Al | 100–350 | 180 |
| Ca | 10–50 | 15 | Zr | 50–200 | 100 |
| Ti | 50–150 | 100 | V | 100–200 | 150 |
| Mo | 100–300 | 180 | Ni | 20–100 | 80 |
| Mn | 10–100 | 40 | Cr | 10–50 | 35 |
| Cu | 10–50 | 20 | Co | 10–150 | 10 |
| Mg | <10 | <10 | | | |

*Sulfur content can be maintained to below 0.03%.
**Elements not shown are below detection level.

EXAMPLE V

Superior Graphite Co. also produces 9400 Series spherical graphitic carbon, which is suitable for other embodiments hereof. This free flowing, high purity spherical graphitic carbon product exhibits unusually high mechanical strength under compressive loading.

The 9400 graphitic carbon is highly resistant to oxidation and chemical attack and has good molding properties. The fields of use include refractory mixes, hydraulic fracturing proppant, core molds and as a special shot blast media. Moreover, oxidation inhibitor can be incorporated into the structure to achieve an extremely high degree of oxidation resistance.

TABLE 2

PROPERTIES OF 9400 SERIES SPHERICAL GRAPHITIC CARBON

| | TYPICAL RANGE |
|---|---|
| Carbon Content, Percent | 99.9–99.9+ |
| Sulphur Content, Percent | 0.01–0.03 |
| Size Range, mm | 0.10–0.80[1] |
| Particle Density[2], g/cc | 1.70–1.85 |
| Electrical Resistivity, ohm-cm × $10^2$ | 3.80–4.60 |
| Resiliency, Percent[3] | 35–42 |

[1]The particle size range is −20 +150 mesh Tyler Standard Screen.
[2]Measured by liquid pycnometry.
[3]Resiliency is the percentage increase in sample volume after release of 10,000 psi (703.7 Kg/$cm^2$ compaction pressure).

EXAMPLE VI

A mixed metal powder comprising a blend of 40×140 mesh size neodymium (Nd), iron (Fe) and boron (B)

was blended with sufficient phenolic resin ("Varcum") to act as a binder. The metal powder and resin mixture was then pressed into short 1" diameter cylinders of about ½-inch thickness and having a "green" density of about 5.0 g/cc. These specimens were dried and heated to about 250° C. to set the resin and provide a good strength and hardness to the metal preform. The variously processed pellets were then as shown in the following Table:

TABLE 2A

DENSITY OF POWDER METAL PREFORMS

| Specimen No. | Applied Power, Kw | Time, Min | Final Density, g/cc |
|---|---|---|---|
| 1 | 7.5 | 1 | 5.70 |
| 2 | 10.0 | 1 | 5.59 |
| 3 | 12.8 | 1 | 7.14 |
| 4 | 10.0 | 2 | 7.44 |

Theoretical density for the above composition is 7.55 g/cc.

EXAMPLE VII

A series of further runs was made to demonstrate consolidation of preforms made of silicon carbide. The apparatus used is set forth in FIG. 1 hereof. In such tests, the particulate medium was 9400 RG grade spherical carbon grain produced by Superior Graphite Co. of Chicago, Ill., and as described in the prior Examples hereof. This material contained 1.75 percent boron incorporated into the grain structure, and is made in accordance with U.S. Pat. No. 4,560,409 entitled "Metal Bearing Graphitic Carbons," the teaching of which is incorporated by reference herein.

The 9400 RG product is a preferred material for consolidation of silicon carbide, because boron therein functions as a sintering aid, and its presence in the surrounding grain enhances the densification process. However, other carbide materials which are stable at the reactive temperatures (such as, for example, titanium, tungsten, and the rare earth elements) may be used.

The pre-forms hereof were made by cold uniaxial compaction of Superior Graphite Co. HSC 059 grade silicon carbide powder premixed with 110 percent by weight of 5 micron boron carbide and with 5 percent by weight of phenolic resin dissolved in acetone. The pellets were made in a 1-inch diameter steel die at 20,000 psi to give a green density of 2.14 g/cc corresponding to 66.6 percent theoretical density based on silicon carbide. These pellets were oven dried for 8 hours at 100° C. and then baked at 250° C. for 30 minutes to reduce the formation of volatiles during the electroconsolidation process. A slight shrinkage occurred during the pyrolysis step, but because of a corresponding small weight loss, the density of the pellets remained essentially unchanged.

Figure 2:
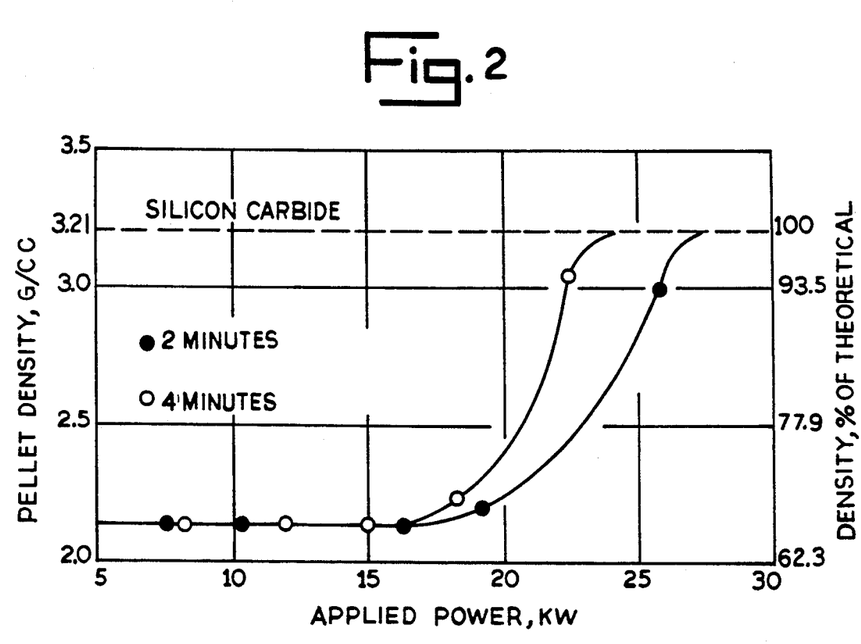
FIG. 2 is a graphical representation of pellet density (in g/cc) graphed against supplied power (KW) and showing the resulting density (as a percentage of theoretical density)

A tabulation of the test conditions and test results is given in Table 3, infra, and shown graphically in FIG. 2 hereof. It is concluded that below about 20 KW applied electrical power, little or no densification had occurred. However, densification was rapid above 20 KW applied power, with pellet density approaching the theoretical density of silicon carbide within several minutes or less.

It should be understood that these data are presented primarily to illustrate that rapid consolidation and densification of a preform of silicon carbide powder has been achieve by the method of this invention. The best conditions for consolidation of silicon carbide and other materials to achieve minimum porosity and an excellent microstructure may require optimizing the main process variables, which can be done based upon such teachings hereof by one of ordinary skill in the art without undue experimentation. These variables include: size of the consolidation chamber, level of applied power, the pressure to be applied, the duration of the consolidation cycle, and the type and electrical characteristics of the particulate pressure transmitting medium. The process conditions table optimized will also depend on the type of material to be consolidated and the size and shape of the pre-form. Also, certain types of shapes of workpieces may call for variation of sequencing and/or compacting pressure.

TABLE 3

ELECTROCONSOLIDATION OF SILICON CARBIDE POWER PREFORMS

| Test No. | Amount Medium | Electrical E. (Volts) | I. (Amps) | Kw | Final Density (g/cc) | (%) |
|---|---|---|---|---|---|---|
| Test Duration 2 Minutes Applied Power |||||||
| 1 | 100 | 8 | 960 | 7.68 | 2.14 | 66.7 |
| 2 | 125 | 10 | 1040 | 10.40 | 2.14 | 66.7 |
| 3 | 125 | 12 | 1360 | 16.32 | 2.14 | 66.7 |
| 4 | 125 | 12 | 1600 | 19.20 | 2.30 | 71.7 |
| 5 | 125 | 14 | 1840 | 25.76 | 3.00 | 93.5 |
| Test Duration 4 Minutes Applied Power |||||||
| 8 | 120 | 8 | 1040 | 8.32 | 2.14 | 66.7 |
| 9 | 120 | 10 | 1200 | 12.00 | 2.14 | 66.7 |
| 10 | 120 | 11 | 1360 | 14.96 | 2.14 | 66.7 |
| 11 | 120 | 12 | 1520 | 18.24 | 2.24 | 69.8 |
| 12 | 120 | 13 | 1720 | 22.36 | 3.05 | 95.0 |

Notes
(1) Preform made with Superior Graphite HSC 059 Silicon Carbide Powder.
(2) Preform size 1-in. D × ½-in. thick. Pyrolyzed at 1500 C. for 30 minutes to a density of 2.14 g/cc before consolidation.
(3) Pressure Transmitting Medium is Superior Graphite 9400 RG Spherical Graphite Grain Containing Boron.
(4) Graphite cylinder 2-in. ID.
(5) Pressure applied: 4,000 psi.

EXAMPLE VIII

Control of resistivity of the electrically conductive flowable particles during consolidation is an important feature of the present invention. In regard to the modification of surface characteristics of the inventive method hereof, the concept hereof of forming a hard carbide surface on graphitic carbon grain to increase its electrical resistivity was tested by reacting the graphitic carbon grain with silica sand at high temperature (1950° C.) in a series of experiments using increasing amounts of sand relative to the carbon. The results provided in Table 4 hereof show: (a) the silicon carbide content (determined as ash content by loss-of-ignition testing of the reaction product according to testing methods known in the art), and, (b) the corresponding electrical resistivity measurement. These data are plotted in FIG. 3.

Figure 3:
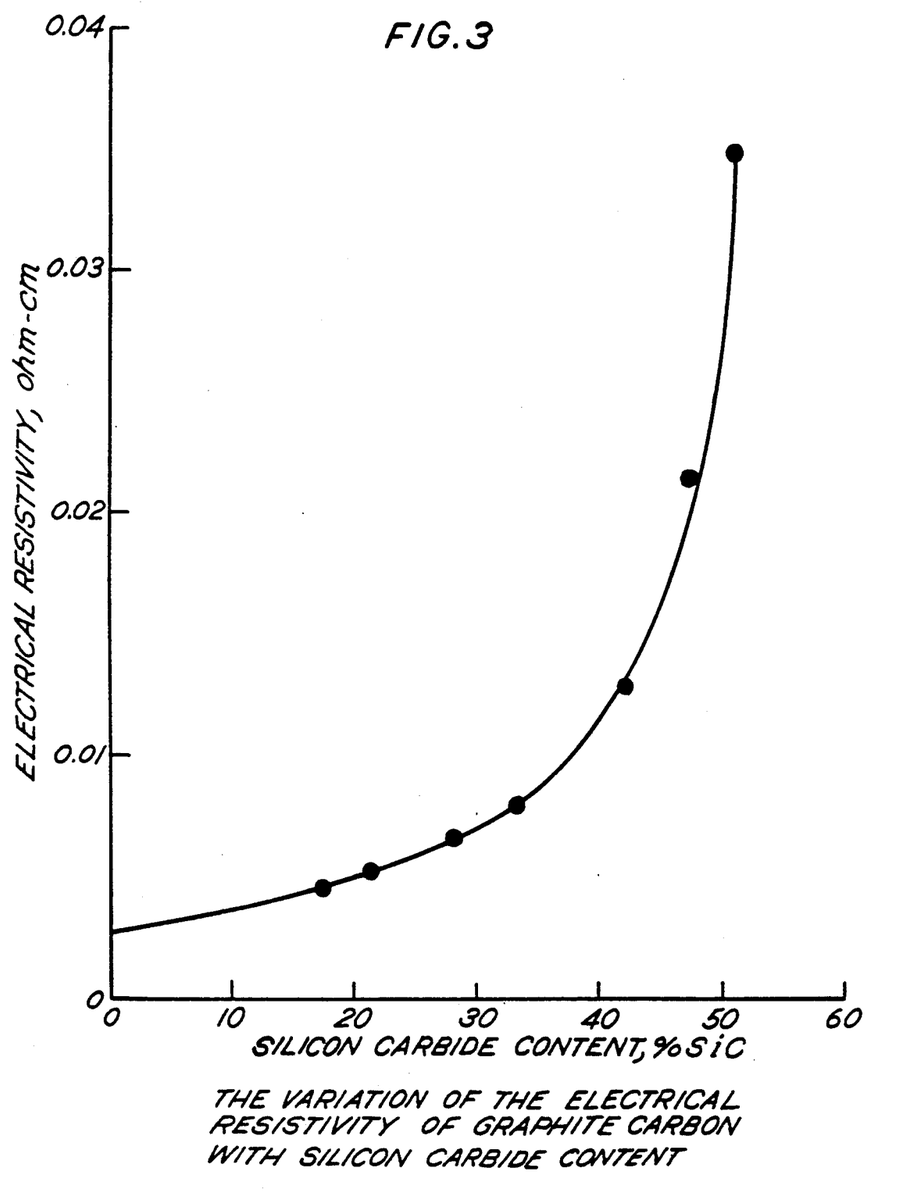
FIG. 3 is a graphic representation of the variation of electrical resistivity of graphitic carbon (in ohm-cm) with silicon carbide content (in percent SiC)

Such data shows that below about 30 percent silicon carbide content, the resistivity of the carbon material is related to the silicon carbide content in an almost linear manner, and accordingly and based thereon one may make a pressure transmitting medium of a specific electrical resistivity within the range of about 0.03 ohm-cm to 0.075 ohm-cm. Above about 30 percent silicon carbide content, the electrical resistivity rapidly increases with silicon carbide content and accurate control of the resistivity of the grain is more difficult to achieve because of the non-linearity of the relationship therebetween.

EXAMPLE IX

The change in resistivity of the 9400 spherical graphitic carbon grain can also be increased by reacting the grain at high temperature (2000° C.) with boron, which may be introduced as boric oxide ($B_2O_3$). The addition of only 3.0 percent boron or less via the reaction of the oxide with the carbon yields a product with an almost 10 fold increase in electrical resistivity compared with the non-boronated starting material as shown in Table 5.

TABLE 5

| MEASURED CHANGE IN PROPERTIES OF A BORONATED GRAPHITIC CARBON GRAIN | | |
|---|---|---|
| B (%) | Resistivity [ohm-cm (ohm-in)] | Resiliency (%) |
| 0 | 0.0383 (0.0151) | 79 |
| 1.75 | 0.2972 (0.117) | 52 |

In the case of the use of boron as a means to increase the electrical resistivity of the carbon grain, boron is soluble and very mobile within the graphite crystal lattice; if the amount of boron added is less than the solubility limit of about 2.3 percent, there is no boron rich film formed on the carbon surfaces and little change occurs in the electrical properties of the graphitic carbon. In actuality, the resistivity decreases slightly. However, as set forth in Lowell, C. E., "Solid Solution of Boron in Graphite,: Journ. Am. Cer. Soc. 50 3 142 (1967), when boron is added in an amount that exceeds the solubility limit within graphite, separate phases are formed that yield a very hard surface with the significant increase in the electrical resistivity as indicated in Table 5. Although in the example given the boron content of 1.75% is below the 2.35% solubility limit, localized concentrations at the particle surface exceed the solubility limit.

It is important to note that the addition of elements to form hard carbides, carbonitrides, and other reaction products on the surface of the graphitic carbon can have a significant effect on the resiliency of the material, as well as on the electrical resistivity. Resiliency is a key property related to the effective use of the grain in the controlled electroconsolidation process hereof. As shown in Table 5 hereof, in the case of a boron addition, an increase in resistivity is accompanied by a decrease in resiliency of the material. This phenomenon occurs because as the carbon surface becomes coated with the hard carbide (such as, for example, carbonitride, etc.), it also becomes more brittle, such that when subjected to compaction pressure, points of contact are more readily broken with a reduction in the degree of volumetric expansion after release of the compaction pressure. The loss in resiliency is detrimental to the development of the ideal isostatic type of pressure transmission desired during electroconsolidation and therefore there is a practical upper limit to the incorporation of hard film-forming elements to increase or alter the resistivity characteristics of the graphitic carbon medium. In general, the resiliency of the medium should be greater than 50 percent. The general factors that affect the resiliency of graphitic carbons are provided in Goldberger, W. M. and Thrower, P. A., "The Resiliency of Granular Graphitic Carbons," Proceedings of the 18th Biennial Conference on Carbon, Jul. 19-24, 1987, Worcester, Mass. Publication of The American Carbon Society (1987).

Some of the elements of major interest in forming hard, high temperature stable films on graphitic carbons include those that form the stable carbides, nitrides and carbonitrides. These include inter alia, silicon, boron, titanium, tungsten and the rare-earth elements. Many of these products are described in some detail in U.S. Pat. No. 4,560,409 entitled—"Metal Bearing Graphitic Carbons," and owned by the assignee hereof, Superior Graphite Co., Chicago, Ill.

Although the above discussion and that set forth in U.S. Pat. No. 4,560,409 describe means to add these elements via carbothermic reduction of their oxides, any suitable means to add such elements, for example, by vapor phase reaction of their volatile compounds with the graphitic carbon, may be utilized. An illustration would be the reaction of silicon tetrachloride with hydrogen in the presence of the particulate graphitic carbon above 1400° C. would yield suitable silicon carbide coatings. Similarly, chlorides of boron, titanium, tungsten, etc. could be used to introduce and react the film-forming element with the carbon surface. Vapor phase pyrolysis of organic metal compounds, for example the pyrolysis of silicones, is a viable means to obtain a silicon carbide coating.

Figure 4:
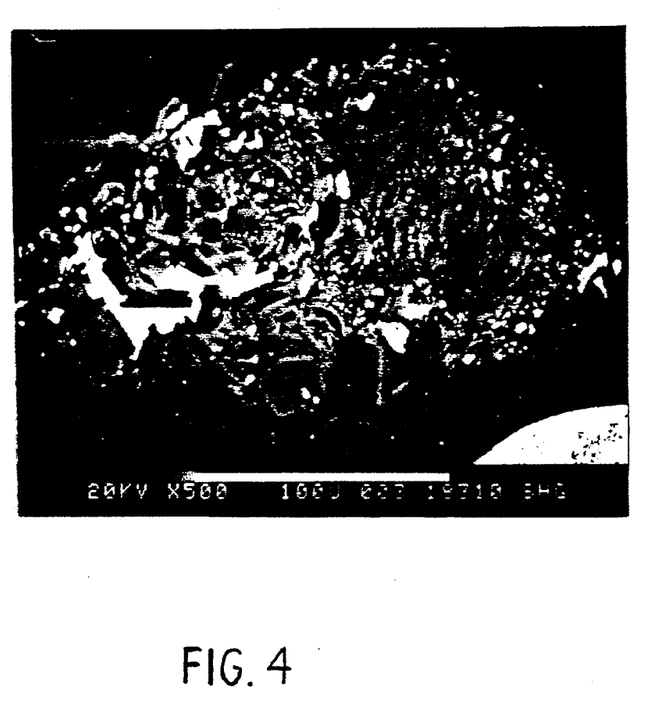
FIG. 4 is a photo-micrograph of a graphitic carbon particle with inclusions of metallic iron at 500× magnification.

Although in the general case, it is desirable to have a pressure transmitting medium with a higher electrical resistivity than graphitic carbon, it is possible in certain cases to prefer a medium having lower resistivity. This can be accomplished by incorporating metallic elements as metallic phases which form internally within the pore structure of the graphitic carbon rather than on the particle surfaces. For example, the reaction of iron oxide with the graphitic carbon at about the melting point of iron (1500°-1600° C.) yields particle structures with metallic iron inclusions (see FIG. 4). X-ray diffraction patterns establish these inclusions as metallic iron. The properties of this iron-intruded graphitic carbon are given in Table 6 hereof.

TABLE 6

| PHYSICAL PROPERTIES OF IRON BEARING GRAPHITIC CARBON | | | | | |
|---|---|---|---|---|---|
| Fe Content (%) | Bulk Density (Kg/M$^3$) | Particle Density (g/cc) | Surface Area (M$^2$/g) | Elect. Resis. ohm-cm | Resiliency (%) |
| 0 | 686 | 1.59 | 0.44 | 0.0241 | 125 |
| 1.3 | 731 | 1.61 | 0.47 | 0.0211 | 116 |
| 4.7 | 789 | 1.72 | 0.57 | 0.0191 | 109 |
| 12.1 | 828 | 2.03 | 0.67 | 0.0145 | 95 |

In this case, the presence of the metallic iron decreases the electrical resistivity. It is noted that the resiliency is also reduced by the presence of the iron. Similar results are shown with the use of nickel.

In summary, highly resilient graphitic carbon grain that serves as a preferred pressure transmitting medium for the electroconsolidation process of the present invention can be subjected to reaction with selected elements to enable control of its electrical properties, such as resistivity. Reaction with elements that form high temperature stable carbides and carbo-nitride structures on the carbon surface are preferred as a means to increase electrical resistivity. Boron is a highly effective hard film-forming element used in amounts above about 1.5 percent, but below about 5 percent in preferred embodiments, to limit the reduction in resiliency. Silicon carbide additions in the range to graphitic carbon yields materials with highly controllable resistivity with the silicon carbide addition of up to 30 percent. Various means to develop the coatings are possible including carbothermic reduction in an inert or nitrogen atmosphere or, by the chemical reaction of the element-containing gases in the presence of the graphitic carbon particles.

The resistivity of graphitic carbons can be reduced by intruding metals, such as iron and/or nickel, into the carbon structure by reacting the oxide or other compounds of the metal with the graphitic carbon at temperatures approaching the melting point of the metal.

The basic and novel characteristics of the improved methods of the present invention will be readily understood from the foregoing disclosure by those skilled in the art. It will become readily apparent that various changes and modifications may be made in the steps, ranges, parameters and conditions of the improved methods of the present invention, taking into account, inter alia, the nature of the material(s) to be processed as set forth hereinabove without departing from the spirit and scope of the invention. Accordingly, the preferred and alternative embodiments of the present invention set forth hereinabove are not intended to limit such spirit and scope in any way.

What is claimed is:

1. In a method of consolidating a preformed workpiece within a bed of a first substance constituting electrically conductive, flowable particles by applying electrical energy to said particles to heat said particles and said workpiece and pressurizing said bed to compact said workpiece, the improvement comprising the step of: controlling the electrical resistivity of such electrically conductive, flowable particles by modifying the particle contact characteristics thereof by incorporation onto such particles a second substance having different characteristics from those of such particles, and wherein the electrically conductive, flowable particles comprise a carbonaceous material.

2. The improvement of claim 1 wherein said second substance is incorporated onto the surface of the electrically conductive, flowable particles.

3. The improvement of claim 1 wherein the electrically conductive, flowable particles comprise a carbonaceous material having pores in the surface thereof.

4. The improvement of claim 3 wherein the second substance is infused into the pores of the carbonaceous material.

5. The improvement of claim 3 wherein the second substance comprises a material providing surface hardness characteristics greater than those of the carbonaceous material.

6. The improvement of claim 3 wherein the second substance is selected from the group consisting of carbides, nitrides and carbo-nitrides.

7. The improvement of claim 6 wherein said carbides, nitrides and carbonitrides are formed from at least one member of the group consisting of silicon, boron, titanium, tungsten and the rare-earth elements.

8. The improvement of claim 3 wherein the second substance is introduced onto the surface of the carbonaceous materials by reaction with at least one of the reactants selected from the group consisting of the chlorides of boron, titanium, tungsten and the rare-earth elements.

9. The improvement of claim 3 wherein the second substance is introduced onto the surface of the carbonaceous materials be means of vapor phase pyrolysis of an organic metal compound.

10. The improvement of claim 9 wherein the organic metal compound pyrolyzed is a silicon.

11. The improvement of claim 3 wherein the carbonaceous material is graphitic carbon.

12. The improvement of claim 11 wherein the second substance is silicon carbide and is introduced onto the carbonaceous material by reaction of silicon carbide with hydrogen in the presence of the graphitic carbon at temperature above approximately 1400° C. to provide silicon carbide onto the surface of the graphitic carbon.

13. The improvement of claim 3 wherein the second substance comprises a material providing surface hardness characteristics less than those of the carbonaceous material.

14. The improvement of claim 13 wherein the second material for providing less surface hardness characteristics is selected from at least one of the group consisting of compounds of iron and nickel.

15. The improvement of claim 3 wherein the second material is a metallic oxide which is reacted with the carbonaceous material at approximately the melting temperature of the metal.

16. The improvement of claim 13 wherein the second material is iron oxide and which is reacted at temperatures of approximately 1500°–1600° C. to form particulate structures having metallic iron inclusions within the pores of the carbonaceous materials.

17. The improvement of claim 3 wherein the second material is boron which comprises approximately 1.5%–5% by weight of the carbonaceous material.

18. The improvement of claim 3 wherein such second material is reacted thereon to by means of carbothermic reaction within an atmosphere selected from the group consisting of the inert gases and nitrogen.

19. The improvement of claim 3 wherein the second substance effectively wets the conductive particles.

20. The improvement of claim 19 wherein the second substance intrudes into the pores of the conductive particles to form a metallic phase in intimate contact therewith for reducing the electrical conductivity thereof.

* * * * *